9254X
G. Holbrook,
Spark Arrester,
Patented Nov. 23, 1835.
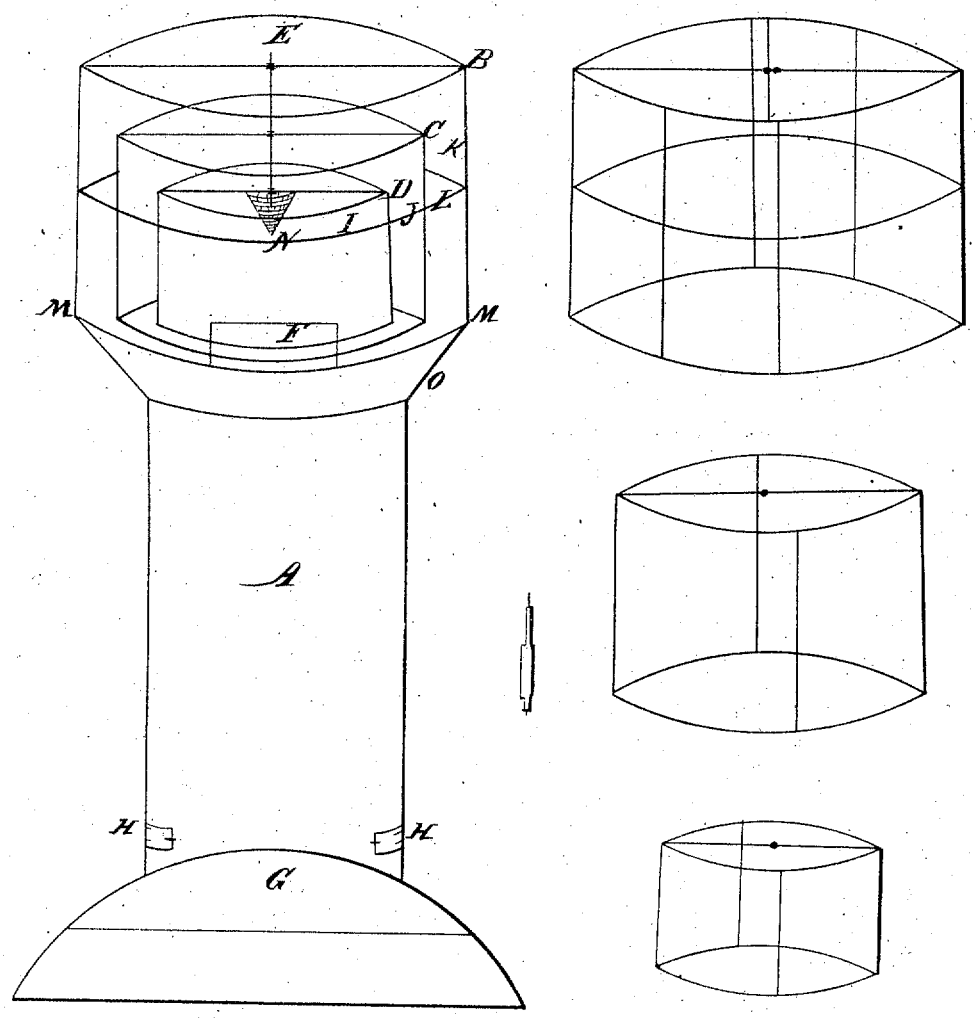

Nov. 23. 1835

George Holbrook of Boston Massachusetts.

9254X

Letters Patent.

The Schedule referred to in these Letters Patent and making part of the same containing a description in the words of the said George Holbrook himself of his Improvement in the Spark arrester for Locomotive Engines &c:

To all Persons to whom these presents shall come. George Holbrook of Boston in the County of Suffolk and State of Massachusetts (Gentleman sends Greeting — Be it Known that I the said George Holbrook have Invented constructed made and applied a new and useful machine not used or Known before its present application to be affixed to the chimneys or flues of Locomotive Engines upon Rail Roads and to the Chimneys or flues attached to Engines on board Steam Boats or wherever any Engine may be used whereby all inconvenience and danger from cinders may be preven-ted and which is here specifically described Viz. First there is a reser-voir so called on the outside of the chimney as now used which is in the form of a cylinder with a branching flaring top or flange the whole encl-osing the flue or chimney and resting at the bottom upon the smoke arch so called. This cilinder or reservoir is made of sheet or cast iron and is a few inches shorter in hight than the chimney. it has at the bottom two small doors from which the cinders when accumulated inside by falling into the reservoir may be taken ~~out~~ at leisure. The reservoir with the parts above described are marked in plan hereto annexed as follows. Viz. Cylinder or reservoir A. Chimney or Flue. F. Smoke arch G. — Doors H. H. — Flaring top or flange C.

Second. On the top of the reservoir is a circular or cilindrical frame wor of three parts and each part covered with a wire netting. This frame work is one of the most essential parts of the machine and is described specified. ly thus. It consists of three frames the one contained within the other. The outer frame is composed of three hoops or bands with the lower one made in such a manner as to be fitted by screws or otherwise firmly to the top of the reservoir and from this rise four stanchions which support two other hoops. the one about half way way to the top and the other at the top. the

9254X hoop at the top is crossed by two pieces diametrically through which at the centre is fixed downwards a post which passes through to the second frame which is made in a similar manner with the outer except being of smaller dimensions and having hoops at the top and bottom only. at the top it is crossed by a piece diametrically through which at the central runs the post this second frame is supported on a shoulder on the post and is made secure above by a nut screwed down upon it. There is within this second frame the third which is smaller than the second and made other wise in a similar manner. This is supported on the post by a shoulder and secured above by a nut as in manner before described. These frames as before described are all covered with a wire netting each one of them cover-ed thus and the netting may be of any description desirable. the use of the frames and of the reservoirs thus becomes manifest. The cinders that escape through the first netting are caught by the second. and those that escape through the second are caught by the third or outer netting and thus successively sifted fall into the reservoir upon which the outer frame rests.

Outer frame B. — The Hoops. The post E.
Second " C — The Stanchions The Netting
Inner " D. — Cross pieces Coarse I,, Fine J. Finer do K, finest L.
Screws & nut M. M. Cone inverted N.

What I claim as my invention and not previously known in the above described improvement and for which I now ask Letters Patent is. the manner of constructing and applying the frames according to the plan al-ready set forth. it being understood that I contemplate varying the num-ber of frames as well as the hoops in each frame occasionally. In testimony that the above is a full description of construction and use of my improvement as invented by me I have hereunto set my hand this fourth day of November in the year Eighteen hundred and thirty five.

Exd. Witnesses
H.G. Henry Stone George Holbrook
Robt Clarke (Drawing.) (826 [illegible])